(12) United States Patent
Fenwick

(10) Patent No.: US 6,827,865 B1
(45) Date of Patent: Dec. 7, 2004

(54) METHOD AND APPARATUS FOR TREATING OIL-WATER EMULSIONS

(76) Inventor: Bradley T. Fenwick, 5400 Planz Rd., No. 1, Bakersfield, CA (US) 93309

( * ) Notice: Subject to any disclaimer, the term of this patent is extended or adjusted under 35 U.S.C. 154(b) by 182 days.

(21) Appl. No.: 10/253,948

(22) Filed: Sep. 24, 2002

(51) Int. Cl.[7] .................................................. B01D 21/02
(52) U.S. Cl. ....................................... 210/802; 210/521
(58) Field of Search ................................ 210/802, 521, 210/522; 96/188, 189, 190

(56) References Cited

U.S. PATENT DOCUMENTS

| | | | |
|---|---|---|---|
| 3,727,770 A | * | 4/1973 | Mochizuki .................. 210/522 |
| 3,903,000 A | * | 9/1975 | Miura et al. ................. 210/251 |
| 6,207,032 B1 | | 3/2001 | Buchanan .................... 204/660 |
| 6,315,898 B1 | | 11/2001 | Bull ........................... 210/187 |
| 6,391,268 B1 | | 5/2002 | Berry et al. ............ 422/186.04 |

* cited by examiner

*Primary Examiner*—Robert A. Hopkins (57) ABSTRACT

A treater for separating oil from water in an emulsion uses vertical coalescing vanes extending through the oil portion into the water portion. The vanes are made of a conductive material, and are electrically grounded in the produced water, and may be coated or partially coated to promote de-watering. Water droplets coalescing on the faces of the vanes are transported down the vane into the water portion and are removed from the system. In a further embodiment, the vanes extend above the oil portion into the gas portion to facilitate removal of gas entrained in the oil. In another embodiment, at least some of the coalescing vanes are rotatable, allowing external control of the flow of fluid through the treater.

18 Claims, 5 Drawing Sheets

METHOD AND APPARATUS FOR TREATING OIL-WATER EMULSIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

The present invention relates generally to methods and apparatus for treating oil/water emulsions, and more particularly to methods and apparatus for coalescing and separating water from oil in an elongate, horizontal separation vessel.

Oil wells typically produce a mixture of oil, gas, and water, typically salt water or brine. The brine might be mechanically mixed with the oil to form what is commonly called an emulsion. The emulsion generally includes small droplets of brine that are suspended in oil. Even though the brine is heavier than oil, the small droplets might remain in suspension for a considerable period of time unless steps are taken to separate the brine from the oil.

It is desirable to separate the oil from the water and gas at the wellhead to facilitate handling of the constituents. The brine may be pumped back into the field and the gas collected or flamed-off, for example, while the oil is transported for further processing. The device used for this is commonly known as a treater.

One general method that has been used to separate brine from oil is to coalesce brine droplets so that they obtain sufficient size to separate from the oil by gravity. Treaters incorporating mechanical, electrostatic, and mechanical-electrostatic techniques have been used to coalesce brine for its separation from emulsions. The emulsion is typically heated, which lowers the viscosity and facilitates separation of the gas. The heated emulsion is then forced through a separation device. Some separation devices have included horizontal louvers directing the emulsion flow to electrostatic grids or packing. One type of packing is essentially a panel of "honeycomb" cells or tubes sloping downward from the inlet end of the cells to the outlet end. Brine coalesces from the emulsion traveling through the tubes, forming droplets large enough to separate from the oil by gravity. Unfortunately, sludge can build up on the horizontal surfaces. The louvers and packing also sit within the oil portion of the treater, and an asphalt-like pad can develop at the oil-water interface. This pad interferes with the separation process, and consumes treater volume. Eventually, the treater may have to be brought off-line for cleaning.

Another approach uses externally controllable vertical louvers to control the flow of emulsion through the treater and to promote de-emulsification by creating vortices and laminar streams of water droplets flowing off the trailing edges of the louvers. Unlike other techniques that seek to avoid laminar flow, the vertical design of these louvers causes a fine sheeting action that provides laminar flow pathways for water to transverse the oil portion into the water portion of the treater. Coalescing elements, such as packing and/or electrostatic grids, are typically included to enhance the de-watering process.

It is desirable to provide simpler, more compact emulsion treaters that avoid sludge formation and re-emulsification. It is further desirable to provide flow control to adapt the de-watering process according to the properties of the incoming crude oil and/or selected water content.

DETAILED DESCRIPTION OF THE INVENTION

I. Introduction

Treatment of crude oil to remove water and entrained gas is efficiently accomplished with vertical coalescing vanes. The vanes may be fixed or movable by external control, and in one embodiment movable vanes are interspersed with fixed vanes. At least some of the vanes extend into the water produced in a treater vessel, thus electrically grounding conductive vanes. The coalescing vanes have a length (measured along the direction of fluid flow) sufficient to promote coalescence of water along the faces of the vanes. The surfaces of the vanes may be treated to promote coalescence, such as with a hydrophilic coating. It is believed that the vanes provide an interface conduit to promote the transfer of water droplets to the produced water in the treater, much like rain drops roll down a window.

Coalescing vanes may also be used in a "knock-out". Knock-outs are often used to pre-treat heavier crude oil to remove free water before sending the emulsion to a treater. This avoids having to heat the removed water in the subsequent treater. Knock-outs typically do not have heaters. In the case of lighter crude oil, a knock-out may provide sufficient separation of free water from the oil, and processing by a subsequent treater might be unnecessary, depending on the original and desired cut (percentage of water). Adding coalescing vanes to a knock-out may provide sufficient separation of water from oil in other instances to avoid subsequent processing in a treater. For example, reduction of the cut from 40% to 10% in a knock-out with coalescing vanes may be sufficient.

Figure 1A:
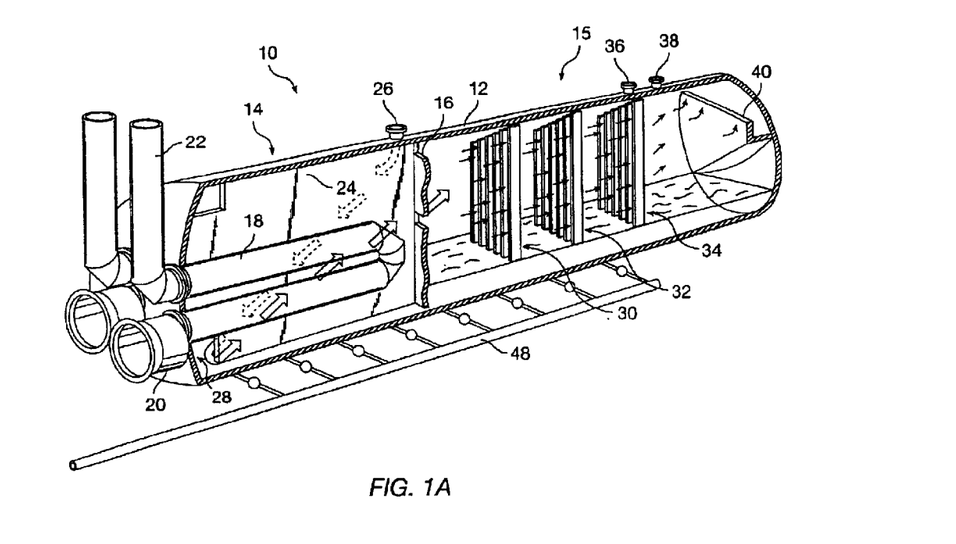
FIG. 1 is a simplified partial cut-away perspective view of a treater according to an embodiment of the present invention.

FIG. 1A is a simplified partial cut-away perspective side view of a treater 10 according to an embodiment of the present invention. Treaters are well known in the art of oil production and many of the features illustrated are common to conventional treaters. Treaters may be used to treat crude oil, reclaimed oil, or emulsions from oil spills, for example.

A horizontal elongated tank 12 is typically, used, and includes a heater section 14 and a treatment section 15, separated by a transverse baffle or bulkhead 16.

The heater section includes firetubes 18, typically fired by natural gas burners 20, but other heating methods could be employed. The burners are vented through firetube stacks 22. The heater section heats the emulsion, typically making it less viscous, promoting separation of the gas from the oil, and promoting flow through the treater. Some separation of gas and water from the oil typically occurs in the heater section. The firetubes are separated from each other by a longitudinal baffle 24. The production inlet 26 is placed on one side of the baffle, and emulsion generally flows down one side of the heater section, through a hole 28 in the longitudinal baffle, and along the other side of the heater section through the bulkhead into the treater section 15.

The treater section 15 includes a coalescing vane system 30 for coalescing water to separate the water from the oil in the emulsion. Three coalescing vane systems 30, 32, 34 are illustrated, but the number of vane systems is merely illustrative. The treater separates the emulsion into three portions: a gas portion, an oil portion, and a water portion, which are not shown, but understood by those of ordinary skill in the art.

The gas portion is above the oil portion, which is above the water portion. Gas is removed through a gas outlet 36. A relief valve 38 is typically provided to avoid undesirably high pressure in the tank. An oil dam box 40 allows the upper oil portion to spill over the dam and be removed through the oil outlet (not shown in this view). Water or brine is removed through a water outlet, which may incorporate a water entrapment header. An optional sand sweep system may be included to remove sand from the treater that was mixed in the emulsion into a sand sweep system 48.

The coalescing vane systems generally include a number of coalescing vanes extending through the oil portion into the water portion. The vanes are typically made of steel or other metal, and are electrically conductive. Extending conductive vanes into the water portion electrically grounds the vanes and provides a ground return path for electrostactic charge generated by the motion of the emulsified brine droplets through the oil. It is believed that the grounded vanes that extend into the emulsion facilitate coalescence of brine on the surface of the vanes by electrostatic action without an external high-voltage generator or separate coalescing grid. Of course, an electrostatic or mechanical grid may be included in a treater if desired.

Extension of the vanes through the oil-water interface into the water does not significantly re-combine water and oil, as might occur with horizontal louvers or vanes. In some conventional treater designs, coalescing devices sit about 3–4 inches above the oil-water interface to avoid building up a pad of sludge that can occur from mixing water into the oil. Designs according to embodiments of the present invention not only avoid generation of the sludge pad, but also allows the operator more processing freedom because he does not have to carefully control the height of the oil-water interface. For example, allowing the water level to rise in some conventional treater designs would bring the oil-water interface into the coalescing devices, which is often undesirable. Similarly, the vanes may extend above the oil-gas interface to facilitate removal of gas entrained or dissolved in the oil.

The length of the vane is defined as the distance generally along the direction of flow, and is sufficient to provide coalescence at or on the surface of the vane. Vanes may be angled to the direction of flow, and the length relates to the physical length of the vane, not the component of the length along the average direction of flow. In a specific embodiment, the vanes are about 10 inches to 12 inches long. It is believed that separation between the vanes also plays a part in the coalescence and removal of water from the emulsion. In general, it is desirable that the spacing between vanes is not more than one-half the length of the vane, and in another embodiment is not more than one-fourth the length of the vane, and in a particular embodiment the spacing (center-to-center) of the vanes is about 1.5 inches for vanes about 10 inches long. Control louvers used in convention treaters are typically much shorter, only about 3 inches long, and are typically spaced about 3.5 inches apart, or hinged together in pairs.

Providing movable vanes that are longer than their separation also allows the channels between the vanes to be completely closed off. This in turn allows a wider range of flow control to be achieved compared to louvers that can't be closed off. It is believed that embodiments of the present invention will allow treaters to be configured to process between 1,000 barrels of crude a day to 70,0000 barrels of crude a day. The flow rate can be set to accommodate any number of variables, such as initial gravity of the crude oil, desired cut, variations in input rate, and viscosity of the emulsion, for example. The movable vanes are externally controlled through any number of mechanisms or techniques, as are well-known in the art. For example, push-rods, rocker arms, lead screws, racks and pinions, sprockets and chain, servo-motors and other techniques may be used in mechanisms to control the rotation of the vanes. In one embodiment, a push-rod for controlling the vanes extends through a packing nut into the treater. The packing nut allows movement of the push-rod while avoiding leakage.

In one embodiment, movable coalescing vanes alternate with fixed coalescing vanes. This simplifies the drive mechanism and allows the fixed coalescing vanes to provide mechanical support to the tank or vessel of the treater, knock-out, or other device. The movable vanes may rotate about an edge (leading or trailing), or about an axis intermediate between the edges of the vane. Providing the rotational axis in the center of the vane can balance the moment, and reduce the force needed to control the flow. The rotational axis may also be chosen with regard to the configuration of the fixed vanes, which may be essentially parallel or angled with respect to the general direction of flow of emulsion. The movable vanes may be essentially similar to the fixed vanes, or may be shorter or longer, for example. In another embodiment, two fixed vanes are between movable vanes. The fixed vanes provide surface area for coalescence and transport of water without the associated motive mechanisms of the movable vanes, which also contribute to coalescence of water and dehydration of the oil.

Figure 1B:
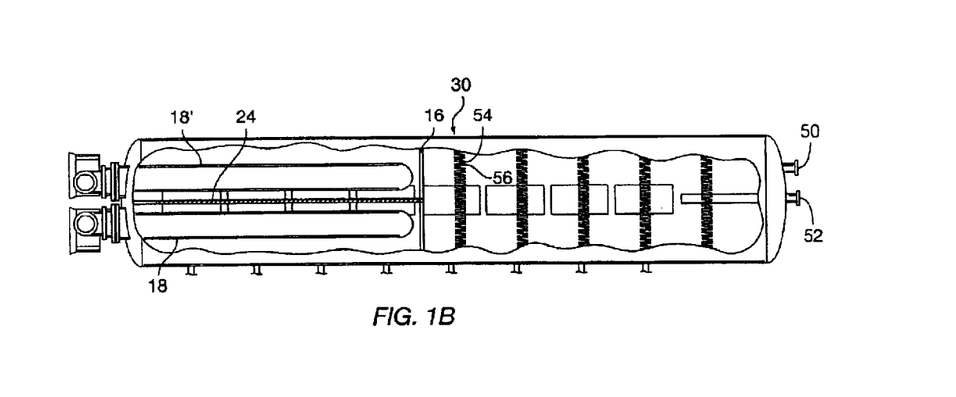
FIG. 1B is a simplified partial cut-away top view of the treater illustrated in FIG. 1A.

FIG. 1B is a simplified partial cut-away top view of the treater 10 illustrated in FIG. 1A. This view further illustrates the longitudinal baffle 24, transverse baffle 16, firetubes 18, 18', oil outlet 50, water outlet 52, and vertical adjustable coalescing vane system 30. In this embodiment, movable coalescing vanes 54 alternate with fixed vanes 56. The movable coalescing vanes have approximately the same length as the fixed coalescing vanes. The movable vanes provide flow control in addition to coalescing of water or brine for removal from the emulsion.

Figure 2:
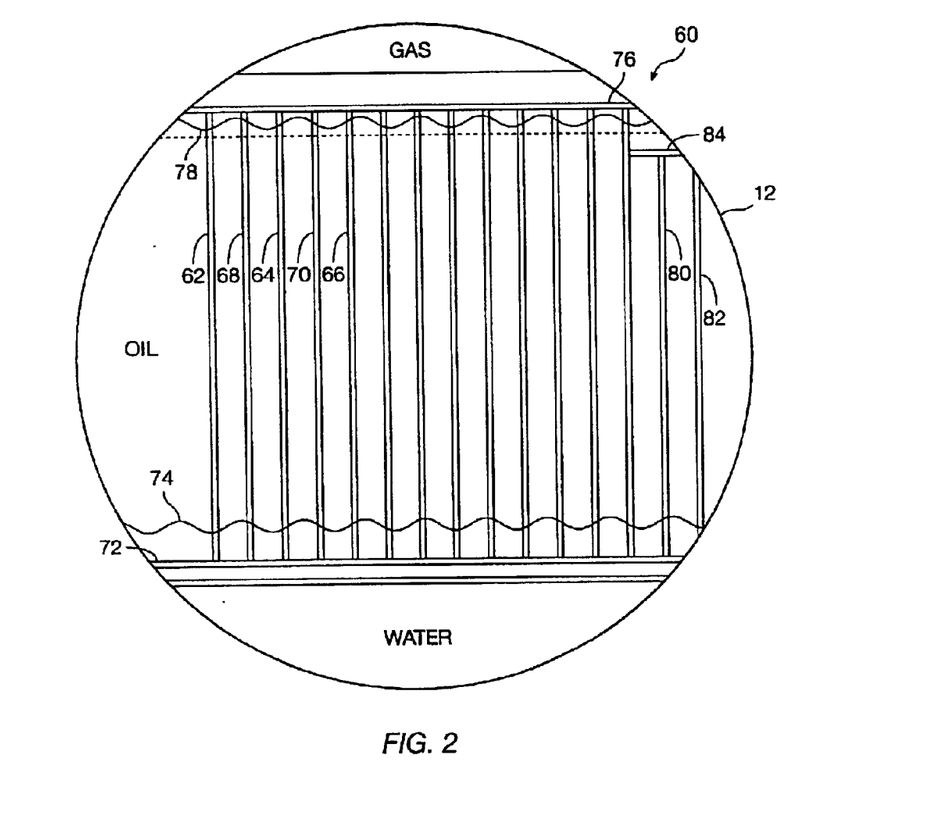
FIG. 2 is a simplified end view of a coalescing vane assembly according to an embodiment of the present invention.

FIG. 2 is a simplified end view of a coalescing vane system 60 according to an embodiment of the present invention. Fixed vanes 62, 64, 66 alternate with movable vanes 68, 70 in the tank 12. The spacing between the vanes is not greater than one-half the length of the vanes. A first vane support 72 is below the oil-water interface 74. A second vane support 76 is above the oil-gas interface 78. The second vane support includes holes or slots to allow gas to escape through the support, and to allow drainage of liquid that might otherwise accumulate on the vane support, either during operation or cleaning. The extension of the vanes into the gas portion is optional, but is believed to provide a combing or raking interface to improve separation of the gas from the emulsion without re-mixing. Extension of the vanes above the gas-oil interface also allows the support structure to be in the gas portion of the treater, thus avoiding the creation of turbulence in the oil portion. The position of the interfaces are merely illustrative for purposed of convenient discussion. In alternative embodiments, some or all of the vanes might extend further, and be connected directly to the tank.

Attaching the vanes to vane supports provides convenient assembly, and allows for additional devices, such as sand entrapment modules or wave baffles, to be installed above or below the vane supports. In a particular embodiment, shorter vanes 80, 82 may be included to extend the vane system closer to the edge of the tank. Secondary vane supports 84 may be attached to a fixed vane 80 and the tank wall, for example. This provides greater coalescence area in the vane system, which in turn allows a shorter treater. In one embodiment, it is believed a treater vessel incorporating conventional dehydration techniques and being about 80 feet long might be shortened to 60 feet using an embodiment of the present invention. The shorter vanes might all be fixed, for example. In such an embodiment, at least some of the shorter vanes might not extend into the water and/or gas portions of the treater.

Figure 3:
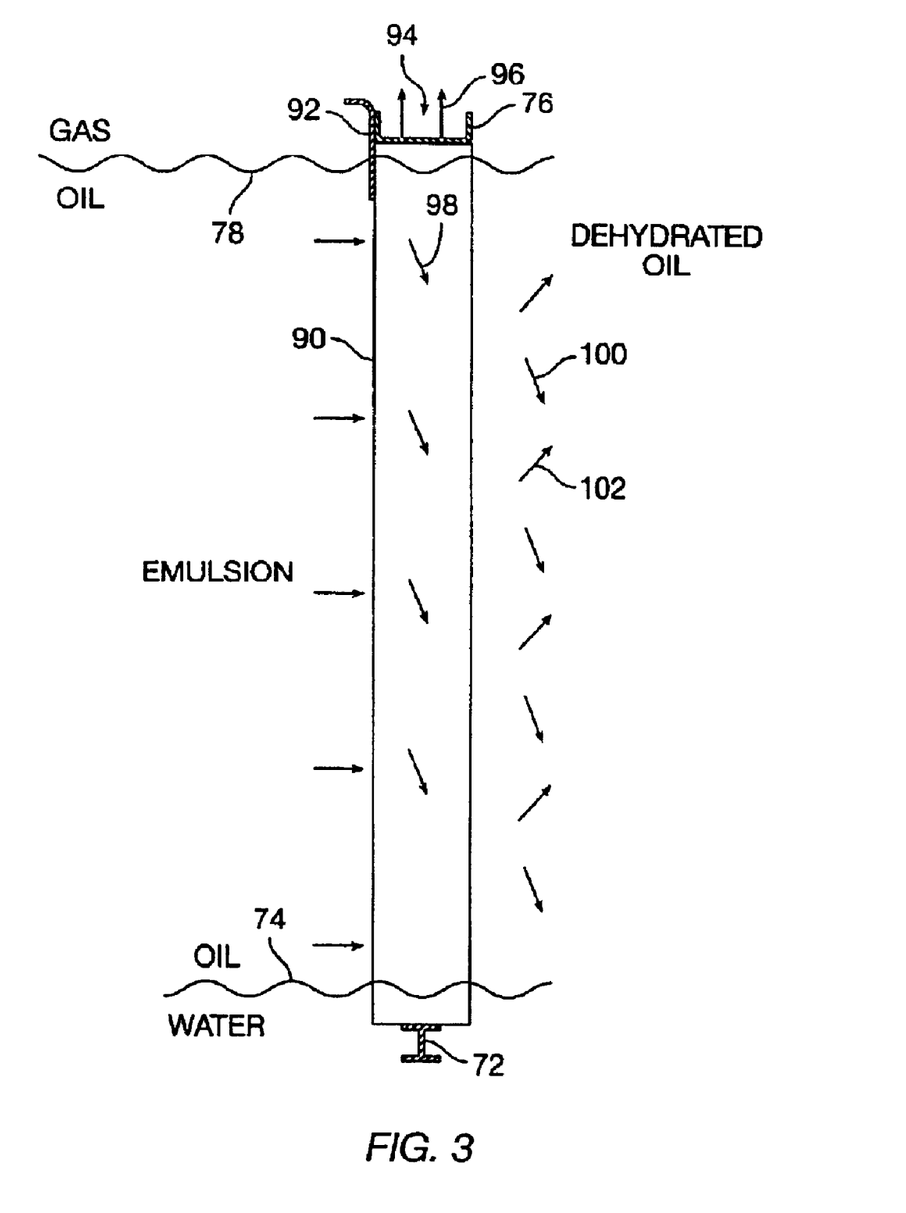
FIG. 3 is a simplified side view of a coalescing vane according to an embodiment of the present invention.

FIG. 3 is a simplified side view of a coalescing vane 90 in a section of a vessel according to an embodiment of the present invention. The vane is fixed or movably attached to upper 76 and lower 72 vane supports. A wave baffle 92 is also shown extending into the oil portion. A gas portion is above the oil-gas interface 78 and a water portion is below the oil-water interface 74, with the emulsion or dehydrated oil forming the "oil portion" between the gas and water portions. In a particular embodiment, the vane 90 extends at least three inches into the water portion and at least two inches into the gas portion. It is believed that straddling the oil-gas and gas-water interfaces with the vanes will prevent or reduce the formation of sludge at these interfaces by providing a raking effect and by breaking up the surface of the oil where sludge might otherwise begin to form. Sludge is generally more likely to form with heavier crude oils, thus embodiments for use with crude oils less likely to form sludge might have different configurations.

The upper vane support 76 includes vent holes 94 for removal of the entrained gas 96 from beneath the support. It is generally understood that the fluid levels may vary during operation of a treater, and that the interface might be essentially flat, wavy or sloped with respect to the axis of the tank.

Water coalesces on the vane and sheets down the face of the vane, as illustrated by downward-pointing arrows 98. Additional coalescence and removal is believed to occur after the vane, as indicated by additional downward-pointing arrows 100, and free water formed on the surface of the vane might also fall through the processed emulsion, rather than running all the way down to the water portion on the surface of the vane. The dehydrated oil tends to rise, as indicated by upward-pointing arrows 102.

Figure 4A:
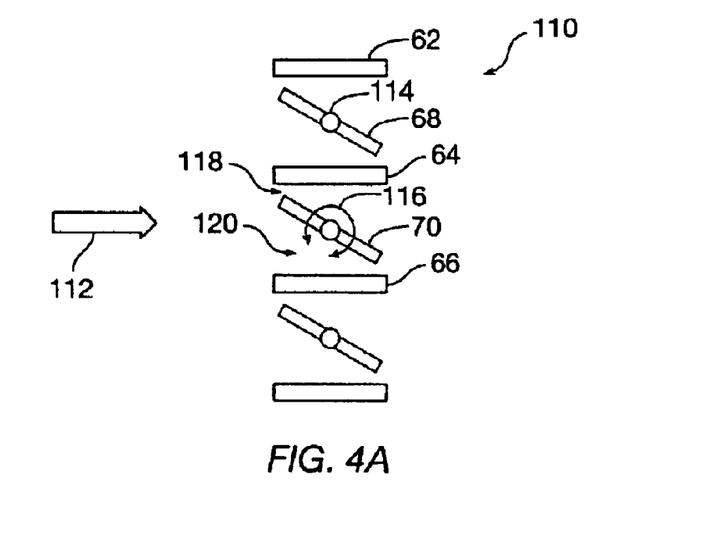
FIG. 4A is a simplified top view illustrating vane rotation and configuration according to an embodiment of the present invention.

FIG. 4A is a simplified top view of a portion of a vane assembly 110 illustrating vane rotation and configuration according to an embodiment of the present invention. Fixed vanes 62, 64, 66 are interspersed with movable vanes 68, 70. The fixed vanes are essentially planar with the average direction of flow 112 and the movable vanes are hinged 114 to balance the moment created when the vanes are rotated, as indicated by the arrow 116, to open or close the gaps 118, 120 between the fixed and movable vanes. Rotating the movable vanes shut creates a constricting gap 120 on the leading face of the movable vane and an expanding gap 118 on the trailing face of the vane. It is believed that the turbulent motion of the emulsion along both the leading and trailing faces of the movable vane, and along the faces of the fixed vanes, promotes coalescence and removal of water. The movable vanes may be longer or shorter than the fixed vanes, and not all vanes need be the same length.

Angled vanes create a pressure differential in the flowing oil that facilitates separation of the water and gas from the oil. The vertical vanes allow gas to rise, avoiding gas packing that can occur with horizontal vanes, as well as sludge formation on horizontal surfaces or at phase interfaces. In contrast, conventional systems that use sloping honeycomb cells or tubes can have gas separate and accumulate in the cell, and try to rise against the flow of emulsion, diminishing flow. This is known as "gas packing". Another advantage of the vertical vanes is that it allows de-watered oil, which is lighter than the emulsion, to rise, in addition to allowing coalesced water to fall. Other systems have focused on treatment of crude oil by removal of the water, without appreciating the benefits of allowing de-watered oil to rise.

All the movable vanes rotate in the same direction, but some movable vanes may move in opposite directions in other embodiments. In this embodiment, a single movable vane controls the gaps between two fixed vanes, and each movable vane has at least one fixed vane between it and the next movable vane, thus simplifying the control mechanism compared to systems in which all vanes are movable. Balancing the torque of the movable vanes reduces the force required to open and close the vanes, thus allowing a lower-power operating device and lighter control mechanism members. It is believed that the ability to allow nearly unrestricted flow, or to nearly completely block the flow through any vane section, will provide the capability to control the flow of normal crude oil products to rates between 1000 barrels per day to about 70,000 barrels per day.

Figure 4B:
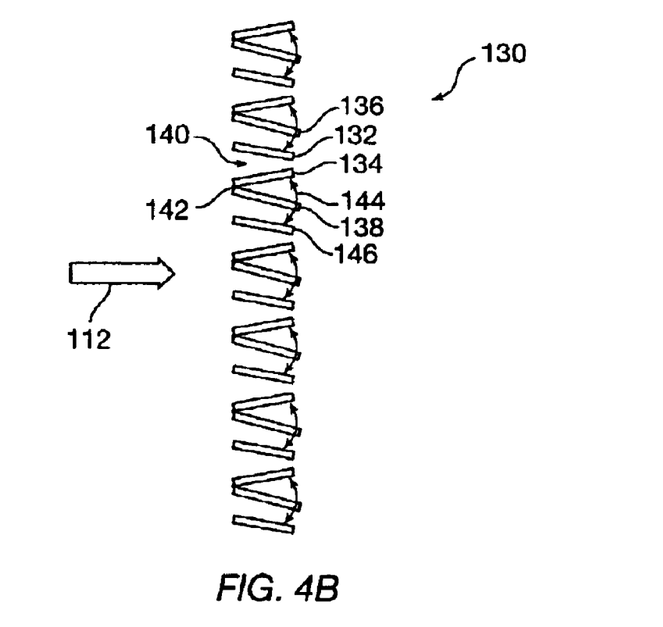
FIG. 4B is a simplified top view illustrating vane rotation and configuration according to another embodiment of the present invention.

FIG. 4B is a simplified top view of a portion of a vane assembly 130 illustrating vane rotation and configuration according to another embodiment of the present invention. Two fixed vanes 132, 134 are between the movable vanes 136, 138. Of course, not all movable vanes in a vane system need be separated by any particular number of vanes, and may be selected according to range of flow control desired. Adjacent fixed vanes 132, 134 are angled to provide a decreasing gap 140 between the fixed vanes. In other words, at least some of the fixed vanes are angled with respect to the flow of emulsion 112. The angle of tilt is selected to provide a restriction ("throttle") or expansion of between about 30–50%. That is, if the gap is decreasing, the tilt angle between the vanes is chosen so that the width of the gap at the trailing edge is 30–50% of the width of the gap at the leading edge.

It is believed that the constriction of the gaps between fixed vanes promotes coalescence of water from the emulsion on the faces of the fixed vanes, thus each pair of fixed vanes provides a fixed coalescing vane module. The movable vane 138 is hinged 142 at an edge of one of the fixed vanes 134 and provides flow control by rotating in the direction of the arrow 144 to constrict the flow between the movable vane and the next fixed vane 146. Rotation of the movable vane toward the closed position can also create a second tapered gap to facilitate the coalescence of water from the emulsion, and this second tapered gap can be constricting or expanding. When the movable vane is rotated to be parallel to the fixed vane, the gap is neither constricting or expanding, but rather has a constant width. Thus, the movable vane and adjacent fixed vane provide an adjustable coalescing module.

Adjusting the flow capacity of a treater is very desirable when adding capacity (wells) during development of an oil field. Additional nozzles can be added as new wells are brought on line, with the vanes of the treater being adjusted to accommodate the additional flow. It is generally desirable to adjust the flow to obtain the desired cut with the minimum heat input. Providing a more efficient treater allows the oil producer to produce oil having less water, which is much more desirable and valuable. The water emulsified with the oil often contains significant amounts of salt, and the gas included in the emulsion often includes $H_2S$. Both salt and $H_2S$ can significantly contribute to the corrosion of refinery equipment, hence refineries greatly prefer oil with less of these constituents, and are willing to pay more for it. Some refineries even refuse oil that is not sufficiently treated.

It is believed that coalescing vane systems according to embodiments of the present invention will provide more efficient removal of water or brine from oil emulsions, perhaps as low as 0.5% for emulsions that are currently being treated to 1.5% using conventional treatments for otherwise equivalent treaters. This efficiency may provide fewer stages (panels of vanes), and hence a shorter treater vessel, or provide treaters that do not require additional water coalescing devices, such as electrostatic grids or additional mechanical apparatus.

Figure 5:
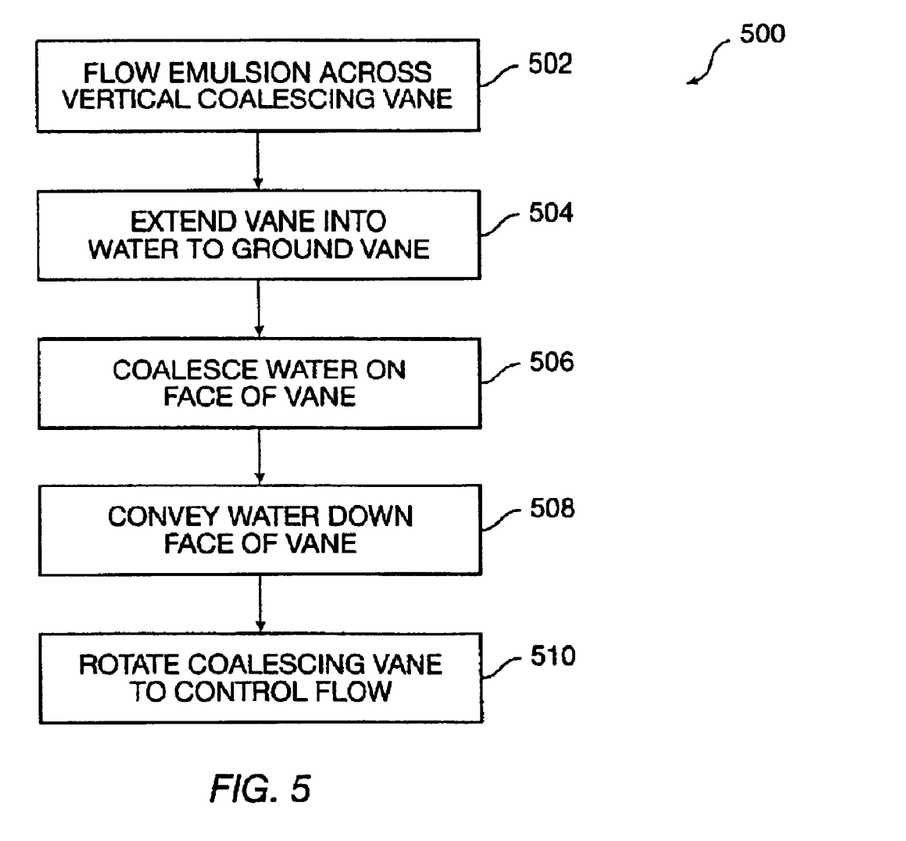
FIG. 5 is a simplified flow chart of a method of de-watering an oil emulsion according to an embodiment of the present invention.

FIG. 5 is a simplified flow chart of a method of de-watering an oil emulsion 500 according to an embodiment of the present invention. Emulsion is flowed across a face of a vertical coalescing vane (step 502). A portion of the vertical coalescing vane extends into water or brine, thus grounding the vertical coalescing vane (step 504). Water coalesces on the face of the vane (step 506) and runs down the face of the vane (step 508). Some water may run down the face of the vane into the produced water portion, and some may separate from the vane and fall through the fluid to the produced water portion. In a further embodiment, the vertical coalescing vane is rotated (step 510) to control the flow of emulsion through the vessel.

While the invention has been described above in reference to particular embodiments and the best mode of practicing the invention, various modifications and substitutions may become apparent to those of skill in the art without departing from the scope and spirit of the invention. Therefore, it is understood that the foregoing descriptions are merely exemplary, and that the invention is set forth in the following claims.

What is claimed is:

1. An emulsion separating apparatus comprising:
   a first vertical coalescing vane disposed in a separation vessel and configured so that the first vertical coalescing vane extends below an oil-water interface into a produced water portion of the separation vessel during operation of the separation vessel, the first vertical coalescing vane having a length suitable for coalescing water from emulsion flowed past a vertical surface of the first vertical coalescing vane; and
   a second vertical vane separated from the first vertical coalescing vane by a spacing distance, the spacing distance being not greater than one-half the length of the first vertical coalescing vane, wherein the second vertical vane is fixed in relation to a direction of flow of emulsion and the first vertical coalescing vane is externally adjustable with respect to the second vertical vane.

2. The emulsion separating apparatus of claim 1 wherein the second vertical vane is a second vertical coalescing vane.

3. The emulsion separating apparatus of claim 1 wherein the length is between 10 inches and 12 inches.

4. The emulsion separating apparatus of claim 1 wherein the spacing distance is not greater than one-fourth the length of the vertical coalescing vane.

5. The emulsion separating apparatus of claim 1 wherein a ratio between the length and the spacing distance is 10:1.5.

6. The emulsion separating apparatus of claim 1 wherein the second vertical vane has a second vertical surface forming an angle of up to 45 degrees with the direction of flow of emulsion.

7. The emulsion separating apparatus of claim 1 wherein the first vertical coalescing vane extends below the oil-water interface at least three inches.

8. The emulsion separating apparatus of claim 1 wherein the first vertical coalescing vane extends above an oil-gas interface at least two inches.

9. An emulsion separating apparatus comprising:
   a movable vertical coalescing vane disposed in a separation vessel and configured so that the movable vertical coalescing vane extends below an oil-water interface into a produced water portion of the separation vessel, the movable vertical coalescing vane having a length suitable for coalescing water from emulsion flowed past a vertical surface of the movable vertical coalescing vane, the movable vertical coalescing vane being externally adjustable; and
   a fixed vertical vane disposed in the separation vessel and configured so that the fixed vertical coalescing vane extends below the oil-water interface into a produced water portion of the separation vessel, the fixed vertical coalescing vane having the length suitable for coalescing water from emulsion flown past a vertical surface of the fixed vertical coalescing vane, the fixed vertical coalescing vane being separated from the first vertical coalescing vane by a spacing distance, the spacing distance being not greater than one-half the length.

10. An emulsion separating apparatus comprising:
   a first fixed vertical coalescing vane disposed in a separation vessel and configured so that the first fixed vertical coalescing vane extends below an oil-water interface into a produced water portion of the separation vessel and above an oil-gas interface into a produced gas portion of the separation vessel, the first fixed vertical coalescing vane having a first length suitable for coalescing water from emulsion flown past the first fixed vertical coalescing vane;
   a second fixed vertical coalescing vane disposed in the separation vessel; and
   a movable vertical coalescing vane disposed in the separation vessel between the first fixed vertical coalescing vane and the second fixed vertical coalescing vane and being externally adjustable, the movable vertical coalescing vane being rotatable about an axis between a leading edge of the movable vertical coalescing vane and a trailing edge of movable vertical coalescing vane.

11. The emulsion separating apparatus of claim 10 wherein the axis is centered between the leading edge and the trailing edge of the movable vertical coalescing vane.

12. The emulsion separating apparatus of claim 11 wherein at least one of the first fixed vertical coalescing vane and the second fixed vertical coalescing vane has a face essentially parallel to a direction of flow of emulsion.

13. An emulsion separating apparatus comprising:
a first fixed vertical coalescing vane disposed in a separation vessel and configured so that the first fixed vertical coalescing vane extends below an oil-water interface into a produced water portion of the separation vessel, the first fixed vertical coalescing vane having a first length suitable for coalescing water from emulsion flown past the first fixed vertical coalescing vane and a first vertical face;
a second fixed vertical coalescing vane disposed proximate to the first fixed vertical coalescing vane in the separation vessel, the second fixed vertical coalescing vane having a second vertical face disposed to throttle a gap between the first fixed vertical coalescing vane and the second fixed vertical coalescing vane between 30–50%;
a third fixed vertical coalescing vane; and
a movable vertical coalescing vane disposed proximate to the first fixed vertical coalescing vane and coupled to the third fixed vertical coalescing vane with a hinge at a leading edge of the movable vertical coalescing vane and being externally adjustable to rotate at the hinge to control a gap between the movable vertical coalescing vane and the first fixed vertical coalescing vane.

14. The emulsion separating apparatus of claim 13 wherein the first fixed vertical coalescing vane, the second fixed vertical coalescing vane, and the third fixed vertical coalescing vane have a first length and the movable vertical coalescing vane has a second length, the second length being different from the first length.

15. The emulsion separating apparatus of claim 14 wherein the second length is greater than the first length.

16. The emulsion separating apparatus of claim 14 wherein the second length is less than the first length.

17. The emulsion separating apparatus of claim 14 wherein the movable vertical coalescing vane is hinged to the third fixed vertical coalescing vane at a leading edge of the third fixed vertical coalescing vane.

18. A method of treating an emulsion of oil and water, the method comprising:
flowing the emulsion across a face of a vertical coalescing vane;
grounding the vertical coalescing vane in water in a lower portion of a treating vessel;
coalescing emulsified water on a face of the vertical coalescing vane;
conveying water down the face of the vertical coalescing vane; and
rotating the vertical coalescing vane to selectively control flow of emulsion through a vessel.

* * * * *